United States Patent [19]

Suzumura et al.

[11] Patent Number: 5,390,491
[45] Date of Patent: Feb. 21, 1995

[54] IGNITION TIMING CONTROL SYSTEM FOR INTERNAL COMBUSTION ENGINE

[75] Inventors: Toshihiro Suzumura, Nagoya; Yukihiro Yamashita, Kariya, both of Japan

[73] Assignee: Nippondenso Co., Ltd., Kariya, Japan

[21] Appl. No.: 186,157

[22] Filed: Jan. 25, 1994

[30] Foreign Application Priority Data

Jan. 26, 1993 [JP] Japan .................. 5-011063
Dec. 10, 1993 [JP] Japan .................. 5-310576

[51] Int. Cl.6 .............................................. F01N 3/20
[52] U.S. Cl. ...................... 60/276; 60/277; 60/285; 123/686; 123/703
[58] Field of Search .............. 60/273, 274, 276, 277, 60/285; 123/672, 686, 703

[56] References Cited

U.S. PATENT DOCUMENTS

| | | |
|---|---|---|
| 4,703,733 | 11/1987 | Fukitomi et al. . |
| 5,165,230 | 11/1992 | Kayanuma .................. 60/276 |
| 5,201,173 | 4/1993 | Fujimoto .................... 60/277 |
| 5,211,011 | 5/1993 | Nishikawa .................. 60/285 |
| 5,233,831 | 8/1993 | Hitomi ........................ 60/284 |
| 5,303,548 | 4/1994 | Shimizu ...................... 60/276 |
| 5,315,823 | 5/1994 | Nishikawa .................. 60/285 |
| 5,337,556 | 8/1994 | Aihara ........................ 60/276 |

FOREIGN PATENT DOCUMENTS 61-205377 9/1986 Japan .
62-103464 5/1987 Japan .
4234516 8/1992 Japan .
510238 1/1993 Japan .

Primary Examiner—Ira S. Lazarus
Assistant Examiner—Daniel J. O'Connor
Attorney, Agent, or Firm—Cushman, Darby & Cushman

[57] ABSTRACT

An ignition timing control system for an internal combustion engine which can perform fast catalyst warm-up operation and prevent stalling at the restart of the internal combustion engine at a low temperature is disclosed. This control system judges whether the engine is in the start state or not, whether the cooling water temperature is lower than the specified temperature or not, and whether the intake air temperature is higher than the preset temperature or not. When these judgments are all affirmative, the system further judges whether the time after the start has reached the control starting time or not, and then whether the engine is in the idle operation state or not. When these judgments are both affirmative, the system sets the target ignition timing retard amount and the ignition timing gradual change time according to the intake air temperature, and then actually performs the ignition timing control according to the target retard amount and gradual retard time. Alternatively, the control system judges deterioration state of a catalyst and controls the ignition timing in dependence on the catalyst deterioration state and the intake air temperature.

20 Claims, 11 Drawing Sheets

IGNITION TIMING CONTROL SYSTEM FOR INTERNAL COMBUSTION ENGINE

BACKGROUND OF THE INVENTION

1. Field of the Invention

The present invention generally relates to an ignition timing control system for an internal combustion engine. More particularly, the present invention relates to an ignition timing control system which performs fast catalytic warm-up by adjusting the ignition timing for an internal combustion engine.

2. Description of the Related Art

Fast catalytic warm-up technique has been well known as a technique to reduce noxious substance contained in burnt gas exhausted from an internal combustion engine in the engine start operation. When the internal combustion engine is in the cold state, the catalytic converter included in the exhaust system is also in the cold state and can not sufficiently work to clean the exhaust gas until it has been warmed up to the specified temperature. The fast catalytic warm-up technique is therefore a technique to retard the ignition timing in order to facilitate the warm-up of the catalytic converter.

Specifically, this ignition timing retard technique applicable to the internal combustion engine in the cold state facilitates the warm-up of the catalytic converter by having the internal combustion engine burn in the stage near the exhaust stroke and introducing high temperature exhaust gas into the catalytic converter.

This technique, however, is not advantageous in that when the ignition timing is retarded immediately after the start of the internal combustion engine when the internal combustion engine is in the cold state, the rotational speed of the internal combustion engine that should increase immediately after the start thereof does not increase accordingly.

In order to solve this problem, a new technique to control the ignition timing according to both the cooling water temperature and the time passed after the start of the internal combustion engine was proposed. It is a technique to warm-up the catalyst when the cooling water temperature is low by retarding the ignition timing only after the specified time has passed instead of retarding the ignition timing immediately after the start of the internal combustion engine. (Japanese Unexamined Patent Publication No. 62-103464.)

Nevertheless, this newly proposed technique still has problem as described in the following, and therefore has been unable to be an appropriate substitution for the first-mentioned technique.

The problem in question is: when the internal combustion engine restarts at a low temperature, while the cooling water temperature has not yet been cooled down so much, part around the intake air port of the internal combustion engine has been cooled down by the cold atmosphere. If the ignition timing retard is sharply controlled in such state by using the proposed technique, fuel would adhere to the cold part around the intake air port, then a sufficient amount of fuel could not be supplied into the cylinders, and consequently engine stalling would be caused.

SUMMARY OF THE INVENTION

It is therefore an object of the present invention to solve the above problem by providing an ignition timing control system for an internal combustion engine which can perform fast catalytic warm-up operation and prevent engine stalling at the restart of the internal combustion engine at a low temperature.

Figure 1A:
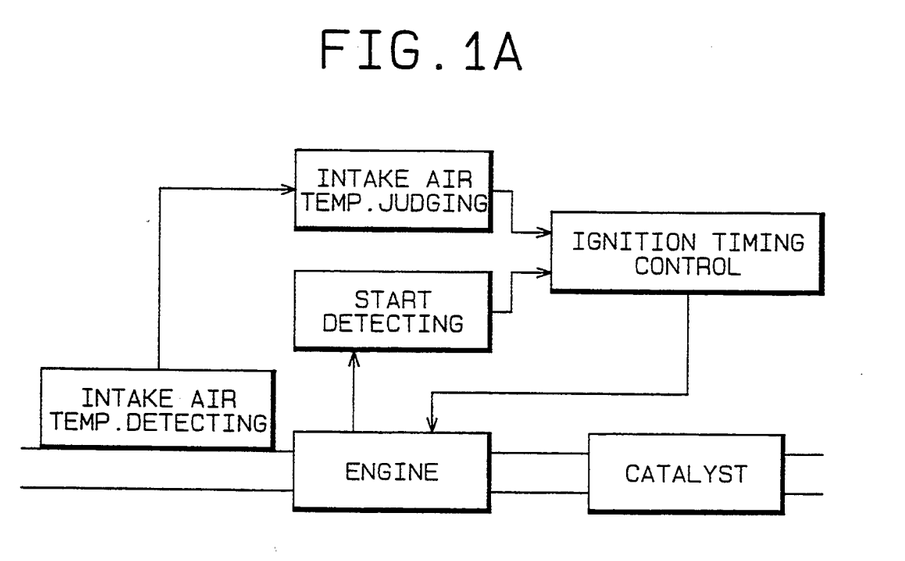
FIGS. 1A and 1B are schematic configuration diagrams illustrating basic configurations of the present invention.

According to a first aspect of the present invention, as illustrated in FIG. 1A, an ignition timing control system for an internal combustion engine is provided with: start time detecting means for detecting the start time of the internal combustion engine; intake air temperature detecting means for detecting the intake air temperature of the internal combustion engine; intake air temperature judging means for judging whether the intake air temperature is higher than a specified temperature or not by using the intake air temperature detecting means; and ignition timing controlling means for adjusting the ignition timing retard state according to the intake air temperature detected by the intake air temperature detecting means when the start time of the internal combustion engine is detected by the start time detecting means and the intake air temperature is judged to be higher than the specified temperature by the intake air temperature judging means.

According to the present invention as described above, it is normally operated that when the catalytic converter is in the cold state, fast catalyst warm-up control is performed to quickly warm-up the catalyst by retarding the ignition timing. When the start time of the internal combustion engine is detected and the intake air temperature is judged to be higher than the specified temperature, the ignition timing retard state, such as the target ignition timing retard amount and the ignition timing gradual change time, is adjusted according to the intake air temperature.

That is, according to the present invention, instead of, for example, changing the ignition timing retard amount according to the cooling water temperature as has conventionally been performed, the ignition timing retard state, such as the target ignition timing retard amount and the ignition timing gradual change time, are adjusted according to the intake air temperature. As a result, engine stalling which may be caused by insufficient intake of fuel when the cooling water temperature is not so low but the intake air temperature is low as typically seen in the restart of the internal combustion engine at a low temperature can be prevented.

Figure 1B:
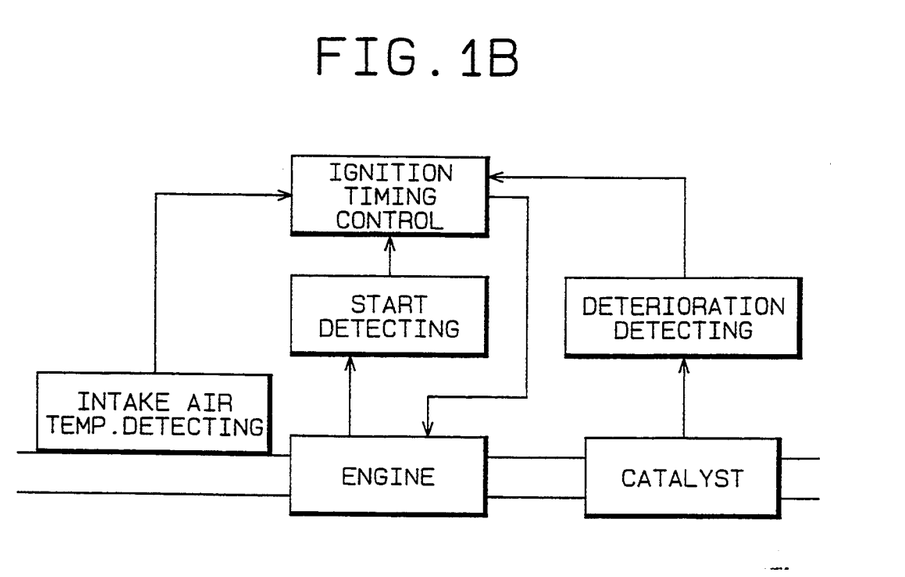

According to a second aspect of the present invention, as illustrated in FIG. 1B, the ignition timing control system is comprised further with catalyst deterioration detecting means. The ignition timing controlling means is adapted to adjust ignition timing retarding operation in accordance with the intake air temperature and the catalyst deterioration state.

This catalyst deterioration responsive control is based on the findings that reaction speed of the catalyst becomes slow and warm-up performance is reduced as the catalyst is deteriorated and that new catalysts tend to be deteriorated when they are subjected to an abrupt temperature rise. To attain the fast warm-up of the catalyst while protecting the catalyst, the target ignition timing retard amount or gradual change time is adjusted.

DETAILED DESCRIPTION OF THE PREFERRED EMBODIMENTS

This invention may best be understood with reference to the following description of the presently preferred embodiments together with the accompanying drawings.

Figure 2:
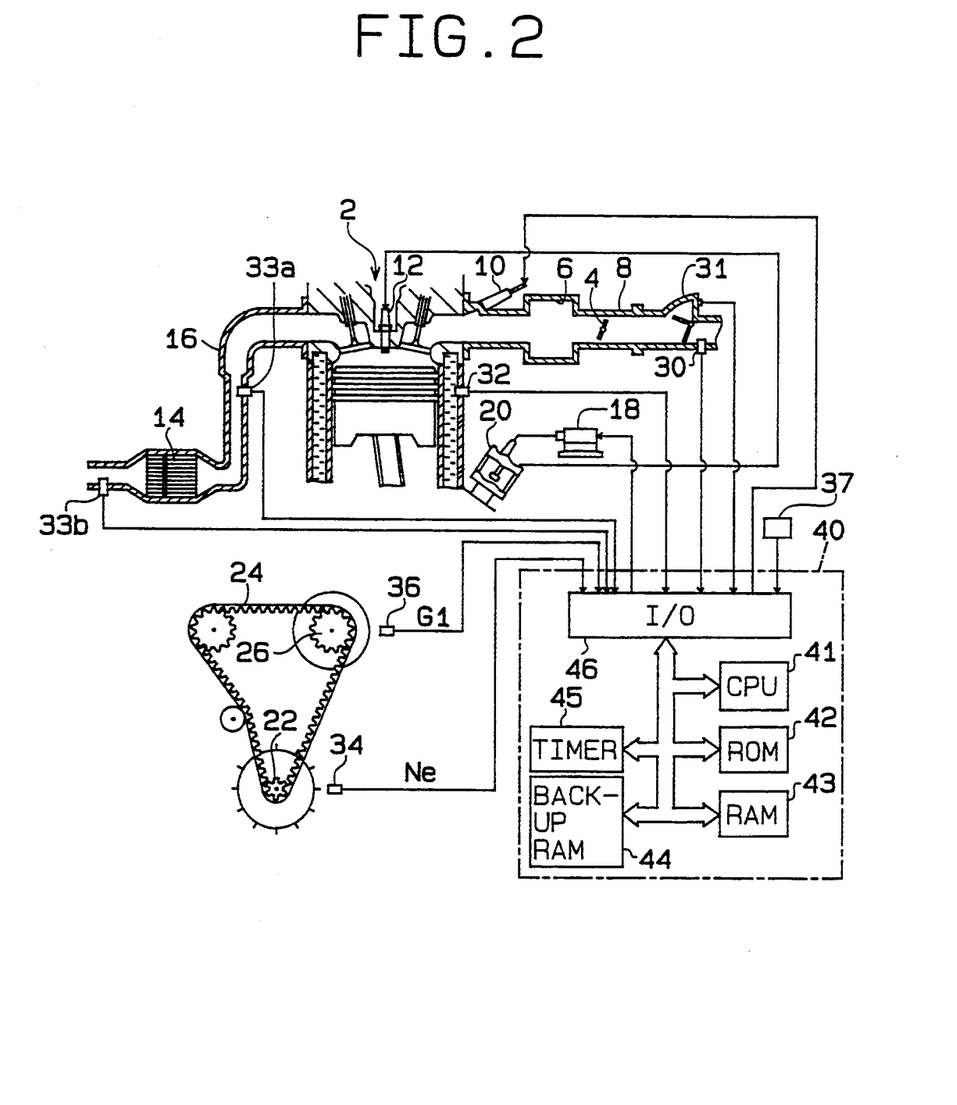
FIG. 2 is a schematic view composition drawing of an internal combustion engine and peripheral units thereof to which the ignition timing control system of the present invention is applied.

FIG. 2 schematically illustrates the configuration of an internal combustion engine and the peripheral units thereof to which an ignition timing control system according to the present invention is applied.

As illustrated in FIG. 2, air is supplied to an internal combustion engine 2 through an intake pipe 8 which includes a throttle valve 4 interlockingly controlled by an accelerator pedal (not shown), a surge tank 6 for removing air surge, and other components. On the other hand, fuel is supplied to each cylinder when a fuel injection valve 10 is opened and ignited by an ignition plug 12. Burnt gas generated by combustion as a result of this ignition is exhausted through an exhaust pipe 16 including a three way catalyst or colatitic converter 14 for cleaning the exhaust gas. High voltage generated by an ignition coil 18 is distributed by a distributor 20 to each ignition plug 12 mounted on each cylinder in such an arranged order that ignition is successively caused to each cylinder. Specifically, the distributor 20 is mounted on a cam shaft 26 connected with a crank shaft 22 of the internal combustion engine 2 through a timing belt 24 in the proportion of two complete turns of the crank shaft 22 to one complete turn of the cam shaft 26. In this arrangement, the high voltage generated by the ignition coil 18 is successively distributed to each ignition plug 12 in each cylinder.

Furthermore, the internal combustion engine 2 includes various sensors for detecting the operation state of the internal combustion engine 2: an intake air temperature sensors 30 for detecting the intake air temperature; an airflow meter 31 for detecting the rate of air flowing into the intake pipe 8; a water temperature sensor 32 for detecting the cooling water temperature; an air-fuel ratio sensor 33a and 33b for detecting the air-fuel ratio of the air-fuel mixture supplied into the internal combustion engine 2 based on the concentration of oxygen in the exhaust gas at the upstream and downstream of the catalyst 14; a crank shaft sensor 34 for generating rotational angle signals for every specified revolution of the crank shaft 22; and an idle switch 37 for detecting whether the accelerator pedal is in the ON position or in the OFF position. The detection signals transmitted from each of the above sensors are received by an electronic control unit (ECU) 40. The ECU 40 is a well-known microcomputer which comprises a central processing unit (CPU) 41, a read-only memory (ROM) 42, a random-access memory (RAM) 43, a backup RAM 44, a timer 45, an input/output (I/O) circuit 46, etc. The ECU 40 controls the air-fuel ratio of the air-fuel mixture supplied into the internal combustion engine 2, the high voltage generation timing from the ignition coil 18 to each ignition plug 12 (i.e., ignition timing), etc. based on the detected signals transmitted from each of the above sensors.

Figure 3:
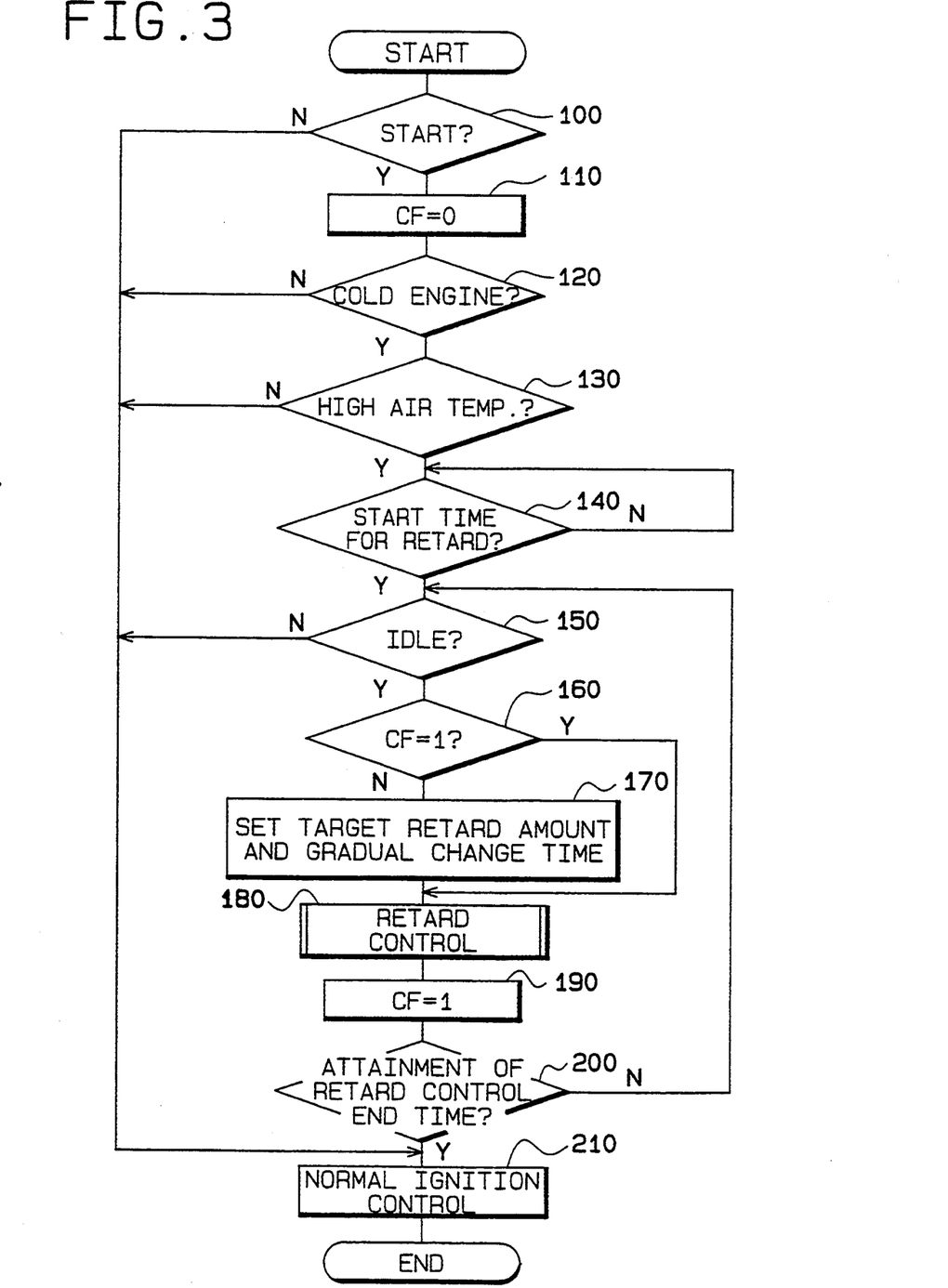
FIG. 3 is a flowchart showing an entire control process according to a first embodiment of the present invention.
Figure 4:
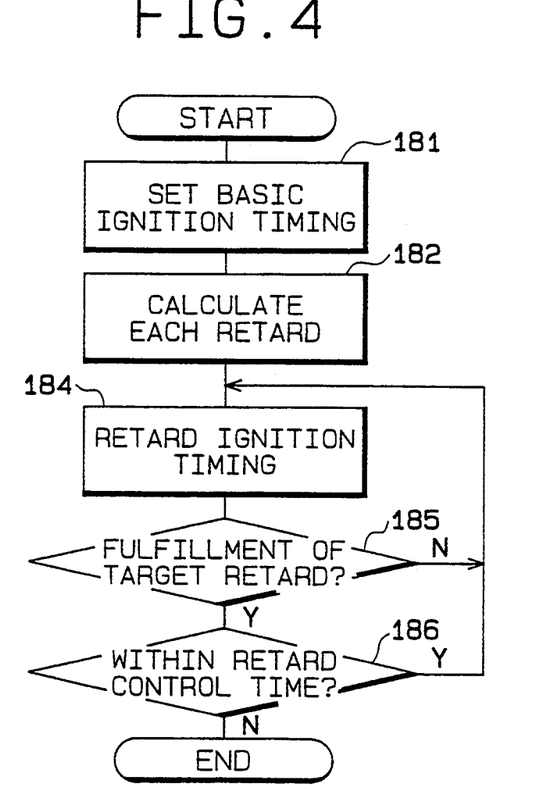
FIG. 4 is a flowchart showing an ignition timing retard control process of the first embodiment.
Figure 5A:
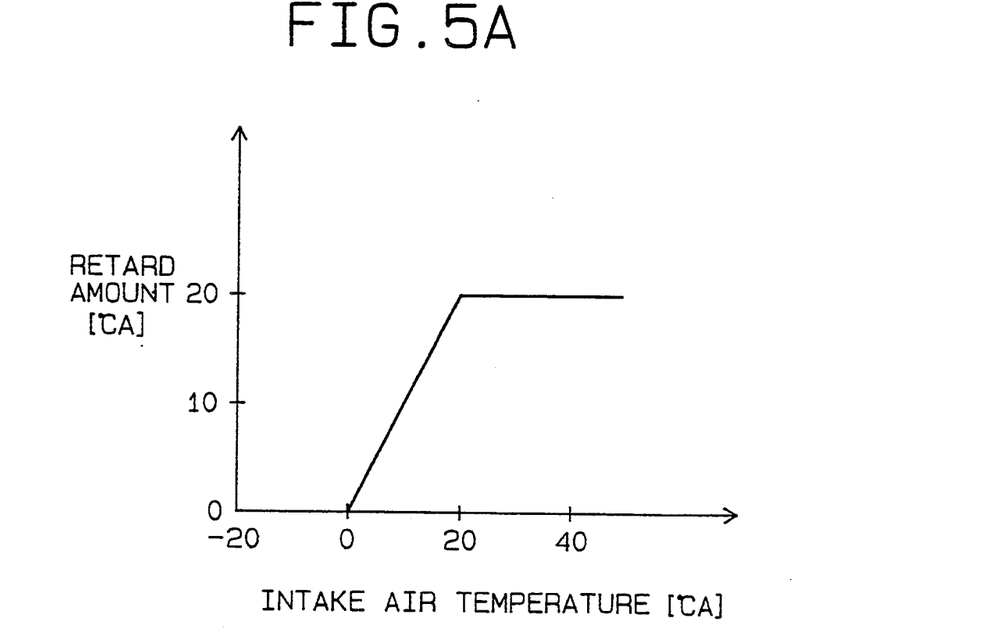
FIGS. 5A and 5B are graphs showing a target ignition timing retard amount map and an ignition timing gradual change time map.
Figure 5B:
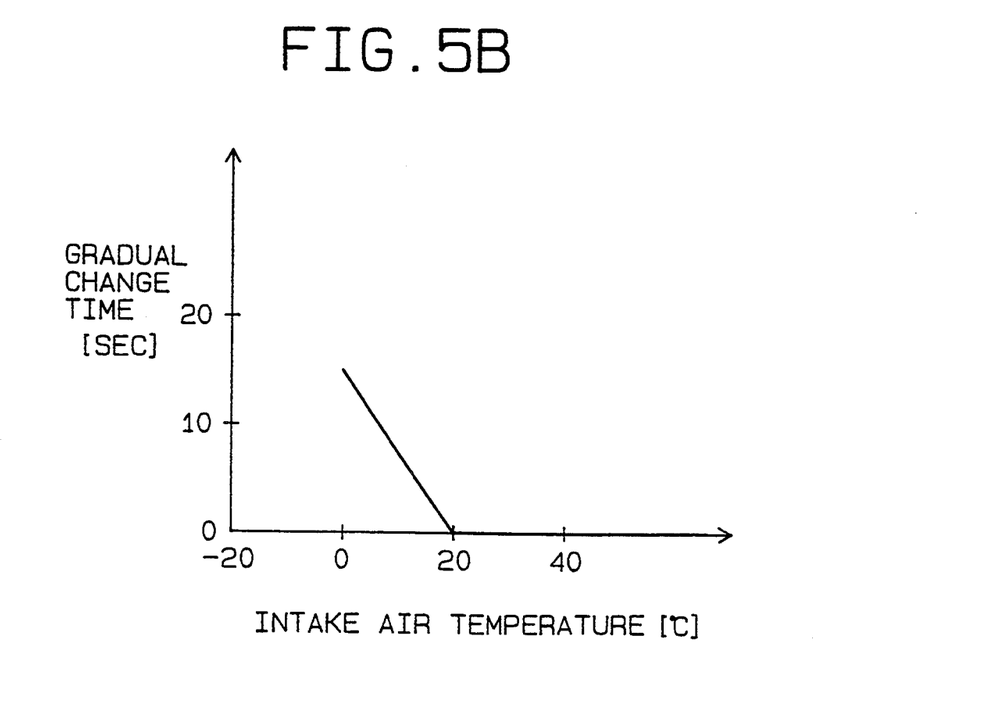

Next, the preferred operation of the ignition timing control system of this first embodiment as per above arrangement will be described referring to flowcharts of FIGS. 3 and 4 and graphs and chart of FIGS. 5A, 5B and 6. FIG. 3 shows a flow of an entire control process including the conditions of the ignition timing retard control and the setting of the control values. FIG. 4 shows a process for actually performing the ignition timing retard control according to the preset control values.

Firstly, in Step 100 in FIG. 3, a judgement is made whether the internal combustion engine 2 is in the start state or not based on a judgment whether an ignition switch (not shown) is in the ON position or in the OFF position. When the judgment is affirmative (Y), the process proceeds to Step 110, and when the judgment is negative (N), the process proceeds to Step 210 and the normal ignition timing advance control is made and this process ends for a time.

In Step 110, ignition timing delay control flag CF, which denotes the performance of ignition timing delay control, is cleared, and the process proceeds to Step 120. In Step 120, a judgment is made whether the cooling water temperature is lower than the specified temperature or not, i.e., whether the internal combustion engine 2 is in the cold state or not, according to the signal transmitted from the cooling water temperature sensor 32. When the judgment is affirmative, the process proceeds to Step 130, and when the judgment is negative, the process proceeds to Step 210. In Step 130, a judgment is formed whether the intake air temperature is higher than the preset temperature (i.e., the temperature proper to the internal combustion engine, e.g., 0° C.) or not according to the signal transmitted from the intake air temperature sensor 30. When the judgment is affirmative, the process proceeds to Step 140, and when the judgment is negative, the process proceeds to Step 210. That is, in this process, when the intake air temperature is higher than the preset temperature, ignition timing retard control is performed to heat the three-way catalyst 14 as described below. When the intake air temperature is lower than the preset temperature, in which state the atmospheric temperature is so low that engine stalling may be caused, the ignition timing retard control is not performed.

In Step 140, a judgment is made whether the time passed after start is within the time range of the ignition timing retard control of this embodiment or not, i.e., whether the ignition timing retard control start time (e.g., 3 seconds after the start) has been reached or not. When the judgment is negative, the process stays waiting for the ignition retard start time, and when the judgment is affirmative, the process proceeds to Step 150. In Step 150, a judgment is made whether the internal combustion engine is in the idle operation state or not based on a judgment whether the idle switch 37 is in the ON position or in the OFF position when the judgment is affirmative, the process proceeds to Step 160, and when the judgment is negative, the process proceeds to Step 210. In Step 160, a judgment is made whether the above ignition timing retard control flag CF has been set or not. When the judgment is negative, the process proceeds to Step 170, and when the judgment is affirmative, the process proceeds to Step 180 to perform the ignition timing retard control as described later.

In Step 170, target ignition timing retard amount (retard angle relative to normal ignition timing) and ignition timing retard gradual change time are set according to the intake air temperature. That is, the target ignition timing retard amount is set according to the intake air temperature referring to the target ignition timing retard amount map stored in the ROM 42 as shown in FIG. 5A. The target ignition timing retard amount is so set as to increase according to the rise of the intake air temperature from 0° C. to 20° C. and then stay at the fixed angle (20° CA) as the intake air temperature rises above 20° C. On the other hand, the ignition timing gradual change time, i.e., the time until the target ignition time retard amount is fulfilled, is set according to the intake air temperature referring to the ignition timing delay gradual change time map stored in the ROM 42 as shown in FIG. 5B. The ignition timing gradual change time is so set as to decreases according to the rise in the intake air temperature from 0° C. to 20° C. and then stay at zero to cause the ignition timing retard to occur immediately as the intake air temperature rises above 20° C.

Figure 6:
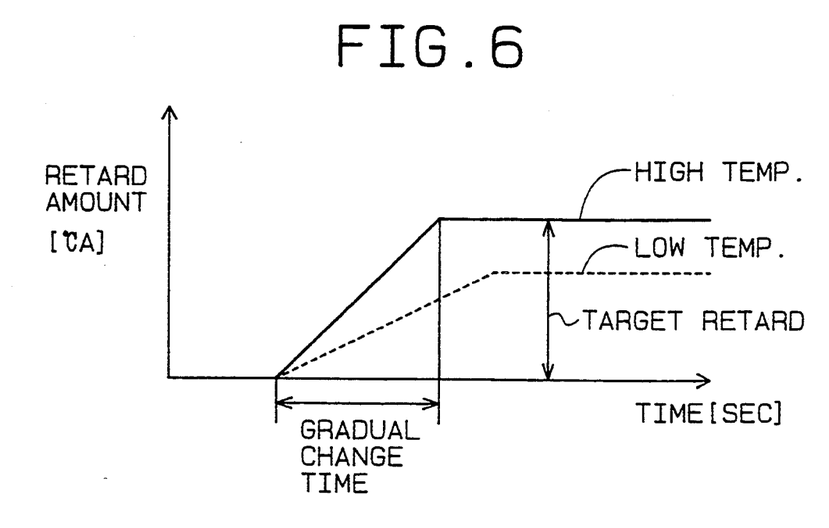
FIG. 6 is a chart showing an overall ignition timing retard characteristics of the first embodiment.

In this embodiment of the present invention, therefore, as shown by a solid line (for high intake air temperature) and a dot line (for low intake air temperature) in FIG. 6, the actual ignition timing retard amount increases by the specified increment that is determined by the target ignition timing retard amount and ignition timing gradual change time (ignition timing retard amount per operation routine) until it fulfills the target ignition timing retard amount, and stays constant when it reaches the target ignition timing retard amount. When the intake air temperature is comparatively high, the ignition timing retard amount increases more sharply as shown by the solid line in FIG. 6.

In Step 180, the ignition timing retard control is actually performed according to the target ignition timing retard amount and the ignition timing gradual change time set in the previous Step 170. This ignition timing retard control will now be further described referring to the flowchart shown in FIG. 4.

In Step 181 in FIG. 4, the basic ignition timing advance amount or normal ignition timing is set referring to the map according to the internal combustion engine rpm and the cooling water temperature. Subsequently, in Step 182, the ignition timing retard amount per operation routine (each retard amount) is calculated by using the target ignition timing retard amount and ignition timing gradual change time both set in the above Step 170 and the following formula (1):

Ignition timing retard amount per operation routine = (Target ignition timing retard amount) × (Operation cycle)/(Ignition timing gradual change time)     (1)

Then, in Step 184, the ignition timing is actually retarded to the value calculated by deducting the above ignition timing retard amount per operation routine from the basic ignition timing advance amount or the ignition timing advance amount previously calculated (corrected ignition timing retard amount) for each operation cycle.

In Step 185 following the above step, a judgment is made whether the total of the deducted ignition timing retard amount has fulfilled the target ignition timing retard amount or not. When the judgment is affirmative, the process proceeds to Step 186, and when the judgment is negative, the process returns to Step 184 to repeat the reduction of the ignition timing retard amount per operation routine. In Step 186, a judgment is made whether it is within the time range specified for performing the ignition timing retard control or not. When the judgment is affirmative, i.e., it is within the time range specified for performing the ignition timing retard control (e.g., within 20 seconds from the start), the ignition timing retard control is continued, and when the judgment is negative, i.e., time lapse reached the time range specified for performing the ignition timing retard control, this process ends for a time. That is, in Steps 181 through 186, the ignition timing retard control is actually performed according to the preset ignition timing retard amount.

In FIG. 3 again, in Step 190 to which the process proceeds after performing the ignition timing retard control in Step 180, the ignition timing retard control flag CF is set as the ignition timing retard control has already been performed, and the process proceeds to Step 200. In Step 200, a judgment is made whether the time passed after the start is within the time range of performing the ignition timing retard control of this embodiment or not, i.e., whether the ignition timing retard control end time (e.g., 18 seconds after the start) has been reached or not. When the judgment is negative, the process returns to Step 150, and when the judgment is affirmative, the process proceeds to Step 210. In Step 210, the ignition timing retard control of this embodiment is ended, and the normal ignition timing advance control is performed, and this process ends for a time.

As described above, in the first embodiment of the present invention, the target ignition timing amount and the ignition timing gradual change time are set according to the intake air temperature, when the internal combustion engine is in cold state, the intake air temperature is higher than the specified temperature, and the internal combustion engine is in the idle operation state. Therefore, engine stalling can be prevented, even if fast catalytic warm-up control, i.e., control to reduce noxious substance in the exhaust gas when the internal combustion engine is in the cold state, is performed. That is, the ignition timing retard is controlled not by a judgment according to the cooling water temperature alone like the conventional way of judgment but by judgment according to the intake air temperature. More specifically, when the intake air temperature is low, the ignition timing is not retarded so much, and when the intake air temperature is considerably high, the ignition timing is retarded by a comparatively large amount. As a result, engine stalling can be prevented, the three way catalyst 17 can be sharply warmed up, and noxious substance in the exhaust gas can be effectively reduced soon after the engine start.

Next, the second embodiment of the ignition timing control system according to the present invention will be described.

Figure 7:
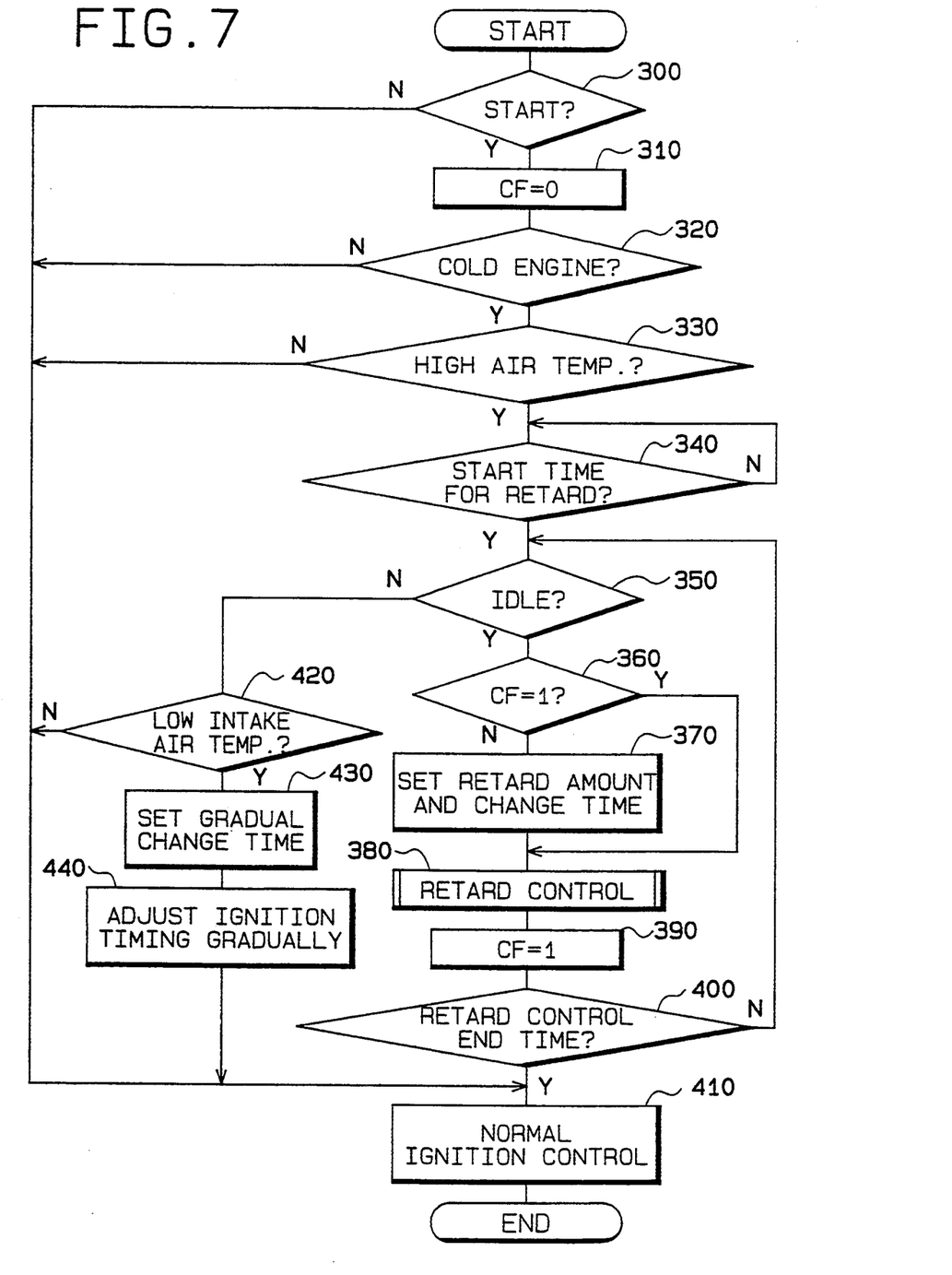
FIG. 7 is a flowchart showing an entire control process according to a second embodiment of the present invention.

As this embodiment has the same hardware configuration as that of the first embodiment, only the control process will be described referring to the flowchart given in FIG. 7. Steps 300 through 410 of this embodiment are the same as Steps 100 through 210 of the first embodiment except only for Step 350 in which the accelerator pedal is trod and the idle operation state is judged to have been released. In this description, therefore, only this difference will be detailed.

In Step 350, when a judgment is made that the idle switch 37 is in the OFF position, the process proceeds to Step 420. In Step 420, a judgment is made whether the intake air temperature is extremely low below the preset temperature or not. When the judgment is affirmative, the process proceeds to Step 430, and when the judgment is negative, the process proceeds to Step 410. In Step 430, as the intake air temperature is low, the ignition timing gradual change time required to return from the ignition timing retard to the normal ignition timing advance is set referring to a map set according to the intake air temperature (i.e., a map showing that the ignition timing gradual change becomes longer according to the fall in the intake air temperature). Subsequently in Step 440, the ignition timing is adjusted according to the ignition timing gradual change time set in Step 430 as described in the above.

In short, in this second embodiment, when the idle switch 37 is turned to the OFF position during the ignition timing retard, a judgment is made whether the intake air temperature is low or not instead of merely returning the ignition timing retard to the normal ignition timing advance. When the intake air temperature is low, the ignition timing retard is gradually returned to the normal ignition timing advance according to the gradual change time set referring to the map of FIG. 5B. Therefore, even if fuel is not sufficiently supplied into the cylinders when the internal combustion engine is in the cold state, engine stalling can be prevented.

As detailed in the above, the target ignition timing retard amount and the ignition timing gradual change time, for example, are adjusted according to the intake air temperature instead of a step that the ignition timing retard amount is changed according to the cooling water temperature as has conventionally been done. Therefore, engine stalling can be prevented, which may be caused by the insufficient intake fuel particularly when the cooling water temperature is not so low and the intake air temperature is low as seen in the start of the internal combustion engine at a low temperature. Accordingly, the catalytic earlier warm-up control, i.e., the control to reduce noxious substance in the exhaust gas when the internal combustion engine is in the cold state, is performed, the catalyst can be warmed up in a short time without causing engine stalling, and noxious substance in the exhaust gas can be effectively reduced.

Next, a third embodiment will be described, in which the target ignition retard amount is adjusted in accordance with the catalyst deterioration state and the intake air temperature.

Figure 8:
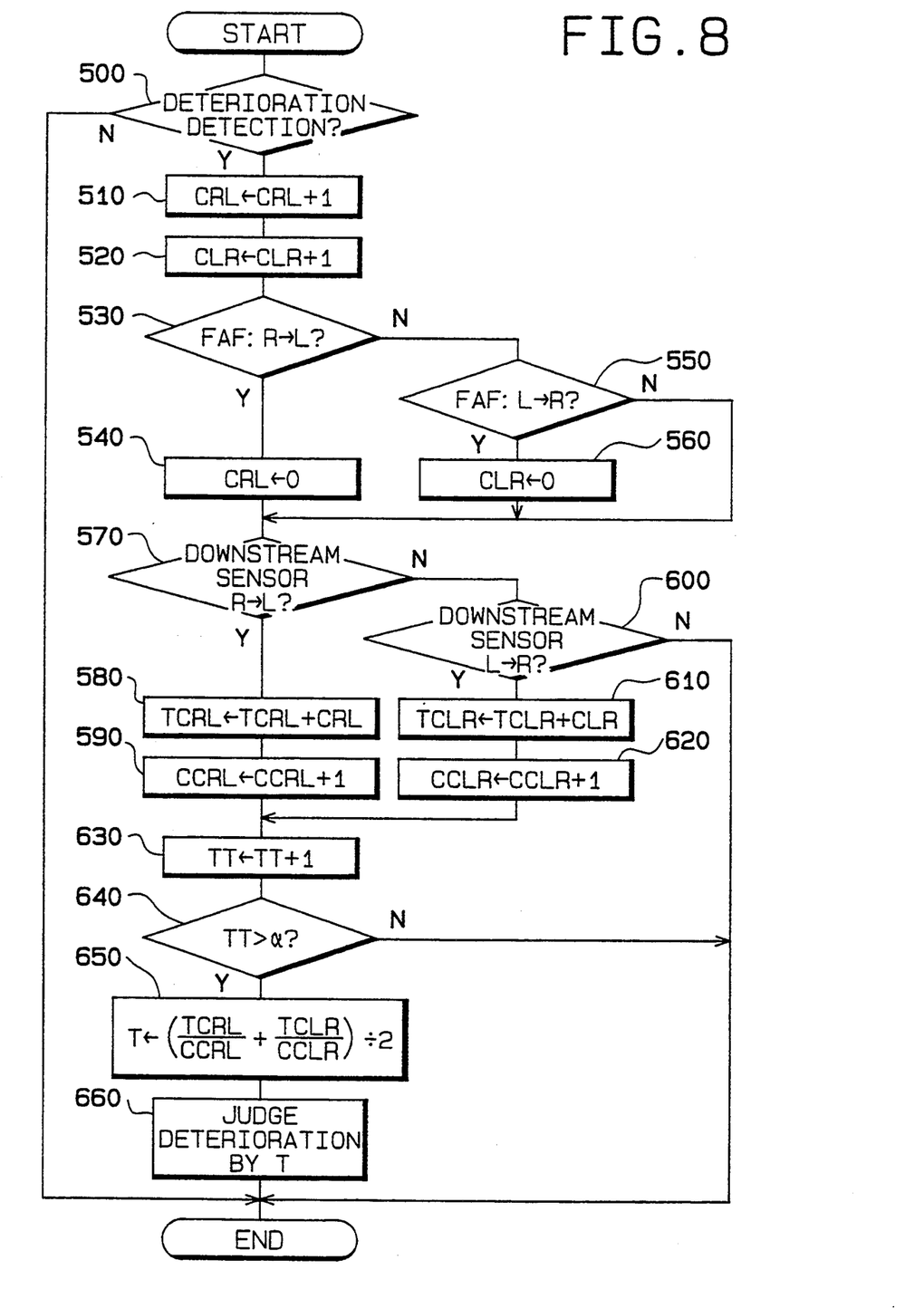
FIG. 8 is a flowchart showing an entire control process according to a third embodiment of the present invention.
Figure 9:
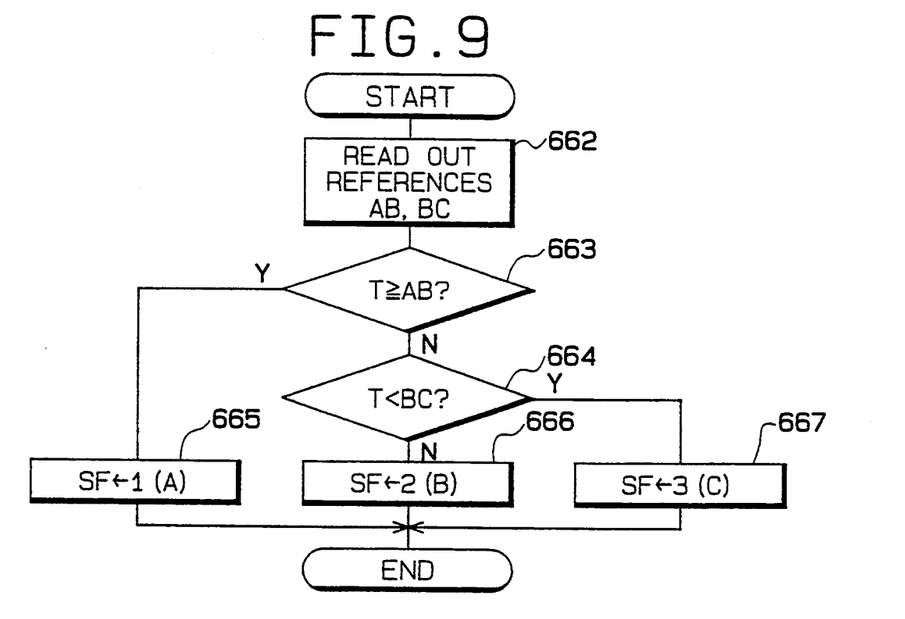
FIG. 9 is a flowchart showing in detail a catalyst deterioration judgement process of the third embodiment.
Figure 10:
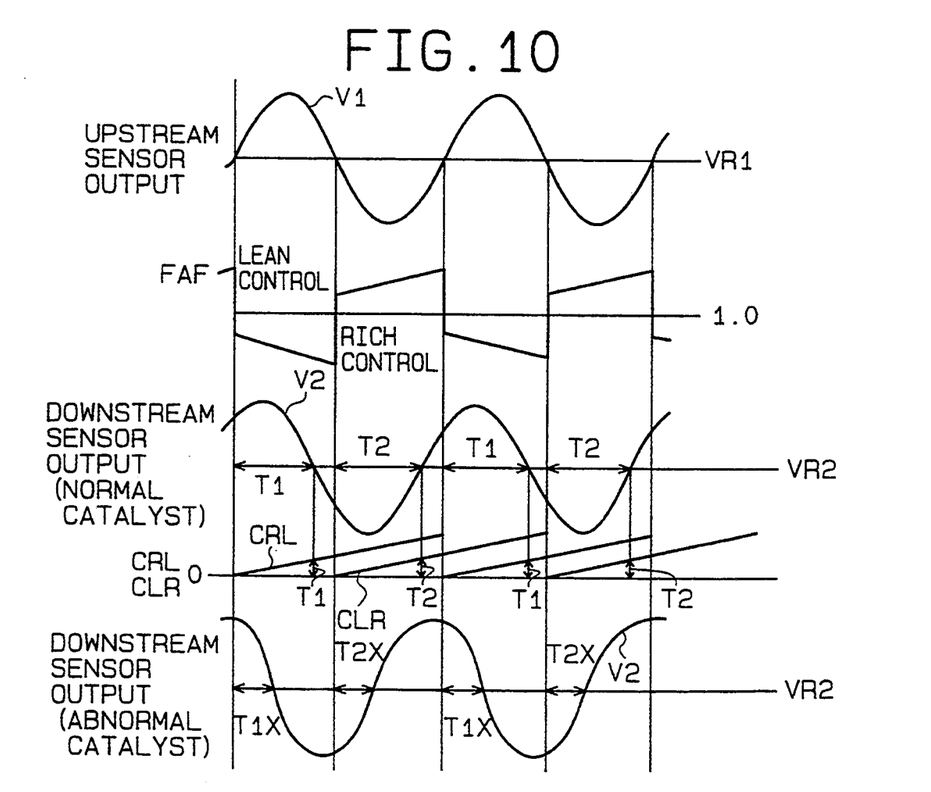
FIG. 10 is a chart showing outputs of upstream and downstream air-fuel ratio sensors.

The catalyst deterioration state detecting process for detecting deterioration of the three-way catalyst 14 is shown in FIGS. 8 through 10. This process is disclosed in the Japanese unexamined patent publication No. 4-321744 and is initiated and performed at every predetermined time interval (for instance, 64 msec). FIG. 8 shows a main flowchart for detecting the catalyst deterioration state, FIG. 9 shows a sub flowchart showing in detail a part of the main flowchart and FIG. 10 shows a time chart showing outputs of the upstream and downstream air-fuel ratio sensors.

This process is based on the finding that, if the three-way catalyst 14 is operating normally, air-fuel ratio changes caused by changes in an air-fuel ratio feedback value (correction coefficient) FAF is transferred to the downstream air-fuel ratio sensor 33b with time delay by storage effect of the catalyst 14. The finding is in more detail that the delay time T1X and T2X of changes in the downstream air-fuel ratio sensor 33b relative to changes in the air-fuel ratio feedback value FAF become shorter than those of respective delay times T1 and T2.

In step 500, in FIG. 8, a judgement is made as to whether catalyst deterioration state detecting conditions are satisfied or not. When the judgement is affirmative, the catalyst deterioration detecting process is performed from Step 510. When the judgement is negative, on the other hand, the process ends for a time. The catalyst deterioration detecting conditions may be, for instance, that (1) air-fuel ratio feedback control is being performed, (2) the air-fuel ratio feedback value FAF or the like is within predetermined limits, and (3) the internal combustion engine 2 is not in the normal operating condition.

In Steps 510 and 520, counters CRL and CLR are incremented. Here, the counter CRL represents a time lapse from the time the feedback value FAF is changed stepwisely from rich (R) to lean (L) and the counter CLR represents time lapse from the time the feedback value FAF is changed stepwisely from lean (L) to rich (R) control. As understood from FIG. 10, the output of the downstream air-fuel ratio sensor 33b crosses a threshold voltage VR2 toward the lean side or the rich side after the respective delay times T1 and T2 relative to the stepwise changes in the feedback value FAT. Therefore, the delay time T1 is counted by the counter CRL from the time of rich-to-lean control change in the feedback value FAF to the time of decrease of the output V2 of the downstream air-fuel ratio sensor 33b below the threshold voltage VR2, and the delay time T2 is counted by the counter CLR from the time of lean-to-rich control change in the feedback value FAF to the time of increase of the output V2 above the threshold voltage VR2.

In Step 530, a judgement is made as to whether or not the feedback value FAF has changed from rich to lean control stepwisely, based on whether the feedback value FAF has changed from above 1.0 to below 1.0. If the judgement is affirmative, Step 540 is performed to reset the counter CRL and then Step 570 is performed. When the judgement is negative, step 550 is performed. In step 550, a judgement is made as to whether the feedback value FAF has changed stepwisely from lean to rich control, based on whether the feedback value FAF has changed from below 1.0 to above 1.0. When the judgement is affirmative, Step 560 is performed to reset the counter CLR and then Step 570 is performed. When the judgement is negative, Step 570 is performed.

In Step 570, a judgement is made whether or not the output of the downstream air-fuel ratio sensor 33b has changed from rich to lean, that is, whether or not the output voltage V2 has changed to below the threshold voltage VR2. When the judgement is affirmative, control proceeds to Step 580. When the judgement is negative, control proceeds to Step 600. In step 580, a current counter value CRL is added to an accumulation counter TCRL which accumulates the delay time T1 and, in the following Step 590, an accumulation number counter CCRL which represents the number of times of accumulation of the counter value CRL is incremented. Thereafter control proceeds to Step 630. In Step 600, on the other hand, a judgement is made whether or not the output of the downstream air-fuel ratio sensor 33b has changed from lean to rich, that is, whether or not the output voltage V2 has changed to above the threshold voltage VR2. When the judgement is affirmative, control proceeds to Step 610. When the judgement is negative, the process ends for a time.

In Step 610, the current counter value CLR is added to the accumulation counter TCLR which accumulates the delay time T2 and then, in Step 620, the accumulation number counter CCLR which counts the number of times of accumulating the counter value CLR is incremented. Thereafter, control proceeds to Step 630 in which executed accumulation counter TT representing the number of times of accumulating the number of times of accumulating the delay times T1 and T2 is incremented.

In Step 640, a judgement is made as to whether or not the accumulation counter TT has reached a predetermined number __. When the judgement is affirmative, the control proceeds to Step 650. When the judgement is negative, the control ends for a time. In Step 650, an average value T of the delay times T1 and T2 is calculated using the following equation (2):

$$T = (TCRL/CCRL + TCLR/CCLR)/2 \qquad (2).$$

In the above equation (2), since TCRL/CCRL corresponds to an average value of CCRL times of the delay time T1 and TCLR/CCLR corresponds to an average value of CCLR times of the delay time T2, the value T obtained by dividing the sum of the above two average values by 2 becomes the average value of the delay times T1 and T2. In the following Step 660, the catalyst deterioration state is judged using this average value T in the manner described hereinbelow with reference to FIG. 9.

As illustrated in FIG. 9, in Step 662, judgement references AB and BC are read out from a map (not shown) is accordance with the intake air quantity to determine which state A, B or C the catalyst deterioration state is in. It is to be note here that the state A represents no deterioration and states B and C represents deteriorations in different degrees. The judgement references AB and BC are set for judging whether the catalyst deterioration state is A or B, and B or C, respectively.

In the following Step 663, a judgement is made as to whether the average value T of the delay times is above the reference AB (comparatively high). When it is judged that the delay time is sufficiently long, Step 665 is performed to set a catalyst deterioration flag SF to 1 which indicates no deterioration state A (new catalyst condition), and the process ends for a time. That is, since the catalyst 14 is considered to be functioning sufficiently if the delay time is long, the deterioration state is judged to be A.

When it is negative in Step 663, Step 664 is performed to judge whether or not the average value T of the delay times is shorter than the reference BC (comparatively short). When it is judged that the delay time is short enough, the deterioration condition is judged as C which indicated insufficient functioning of the catalyst 14. In case of the negative judgement in Step 664, further, the delay time is judged to be a little short since the average value T of the delay times is between the reference AB and BC. That is, the catalyst 14 is judged to be in insufficient functioning because the deterioration state is in B between A and C. Thus, the catalyst deterioration states A, B and C are judged based on the delay time average value T calculated in the processings of FIG. 8 and the references AB and BC read out in accordance with the intake air quantity Q.

Figure 11:
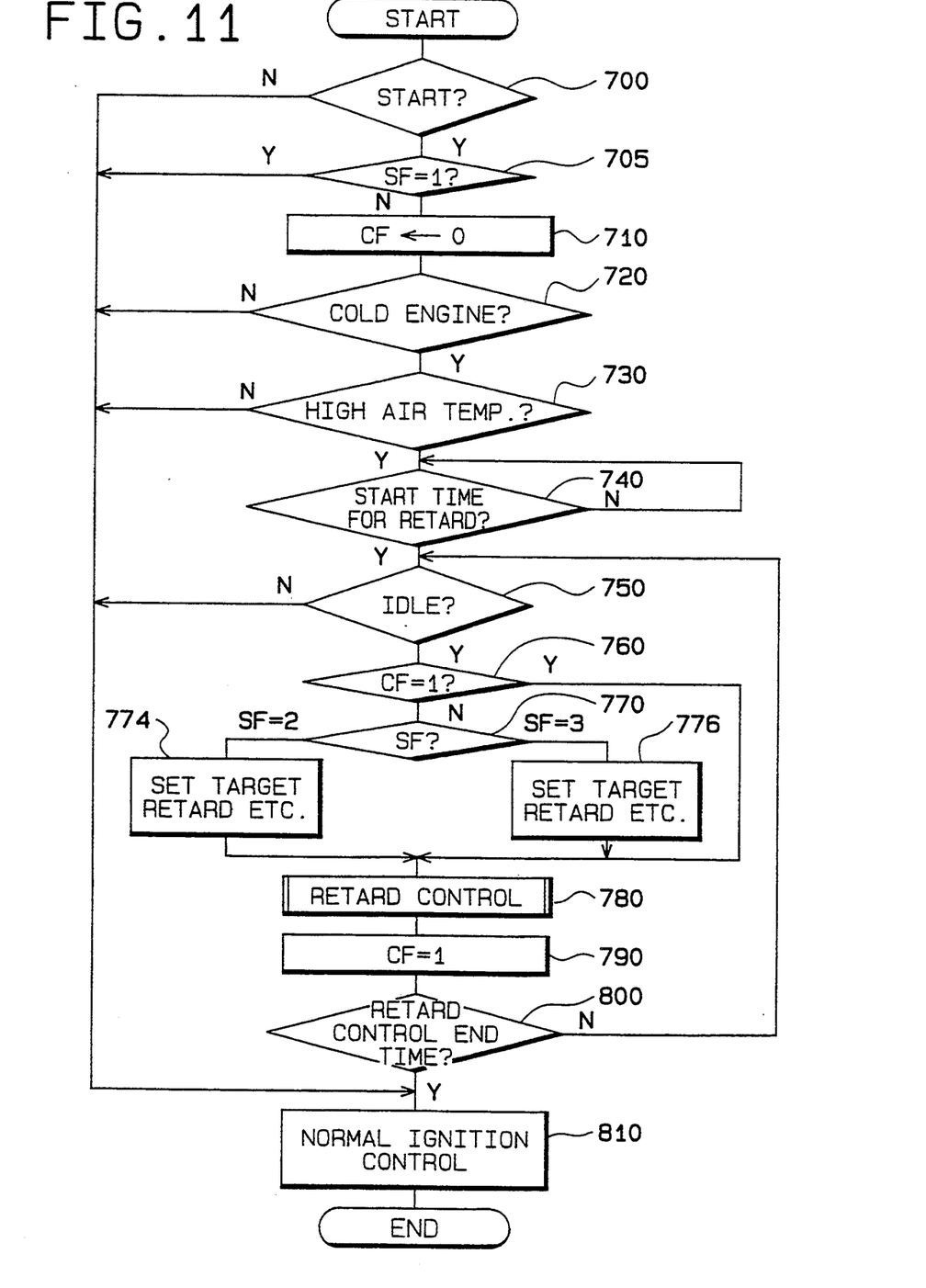
FIG. 11 is a flowchart showing ignition timing retard control process performed in accordance with catalyst deterioration state and intake air temperature.

Next, with reference to FIGS. 11 through 13, the ignition retard control process for adjusting the ignition timing in accordance with the above-described catalyst deterioration state will be explained. FIG. 11 illustrates a flowchart for the ignition retard control and FIGS. 12 and 13 illustrate maps for setting control amount in accordance with the catalyst deterioration state.

As illustrates in FIG. 11, a judgement is made in Step 700 as to whether the engine 2 is in the starting condition or not. When the judgement is affirmative, the control proceeds to Step 705. When the judgement is negative, on the other hand, Step 810 is executed to perform normal ignition advance control by which no ignition retard is made, and the process ends for a moment. In Step 705, judgement is made as to whether the catalyst deterioration state is A or not, with reference to whether the catalyst deterioration flag SF is 1 or not. When the judgement is affirmative indicating that the catalyst corresponds to the new one, the control proceeds to the Step 810. When the judgement is negative, an ignition retard control flag CF indicating the execution of the ignition retard control is cleared to proceed to Step 720.

The following Steps 720 through 750 are the same as the Steps 120 through 150 described in the first embodiment, and hence no detail explanation will be made.

In Step 760, a judgement is made as to whether the ignition retard control flag is set or not. When the judgement indicated that the retard control flag CF has not been set, ignition retard control is performed in Step 780. In Step 770, the catalyst deterioration state SF=2 or 3 is judged based on the deterioration flag SF. When the deterioration flag SF is 2 indicating that the deterioration state is B, the process proceeds to Step 774. When the deterioration flag SF is 3 indicating that the deterioration state is C, the process proceeds to Step 776.

Figure 12A:
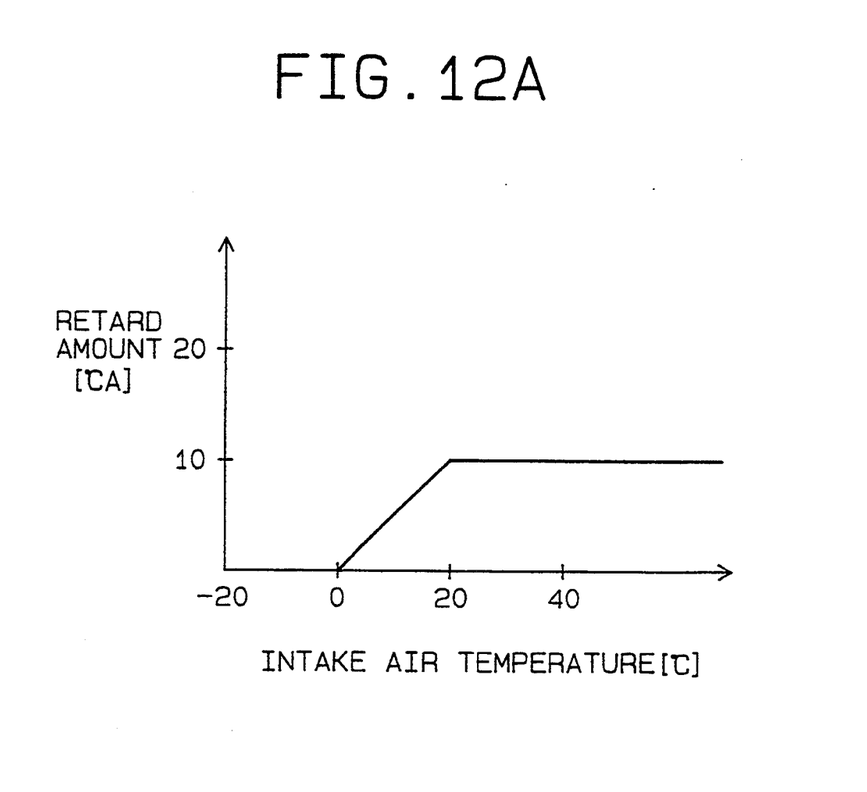
FIGS. 12A and 12B are graphs showing a target retard amount map and an ignition retard gradual change time map, respectively.

In Step 774, the target ignition retard amount and retard gradual change time are set using maps 1 and 2 which are set in correspondence to the deterioration state B indicating a little deterioration of the catalyst 14. That is, as shown in FIG. 12A, the target retard map is referred to and the target ignition retard amount is set in accordance with the intake air temperature. The target retard amount is so set as to increase as the increase in the intake air temperature in the intake air temperature range from 0° C. through 20° C. and be constant (10° CA) in the intake air temperature range above 20° C.

Figure 12B:
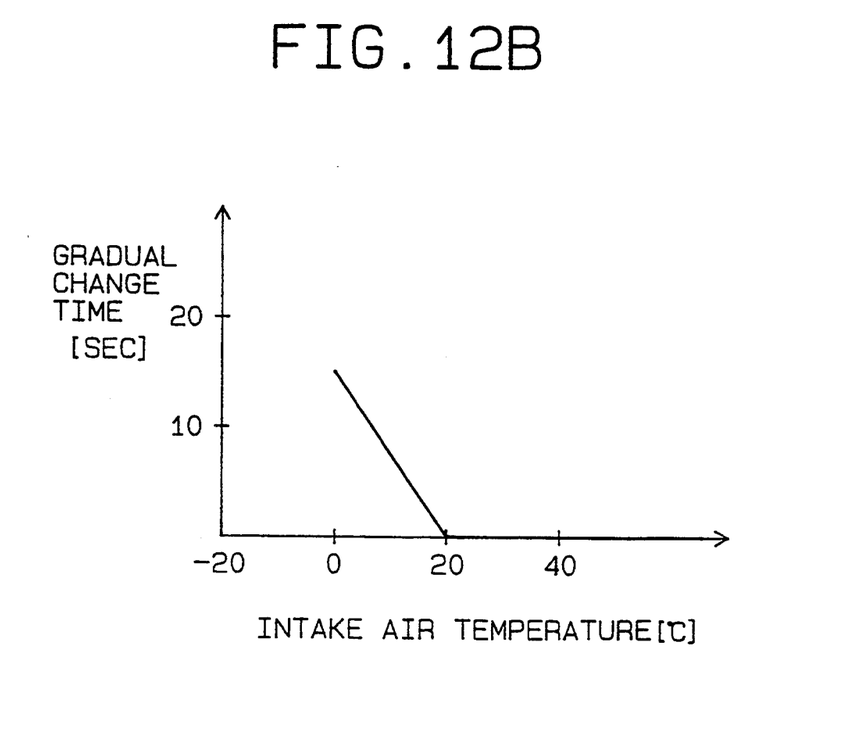

Further, as illustrated in FIG. 12B, the retard gradual change time map is referred and the gradual retard change time is set. This gradual retard change time is so set as to decrease as the increase in the intake air temperature in the intake air temperature range below 20° C. and is zero in the temperature range above 20° C. to immediately retard the ignition.

Figure 13A:
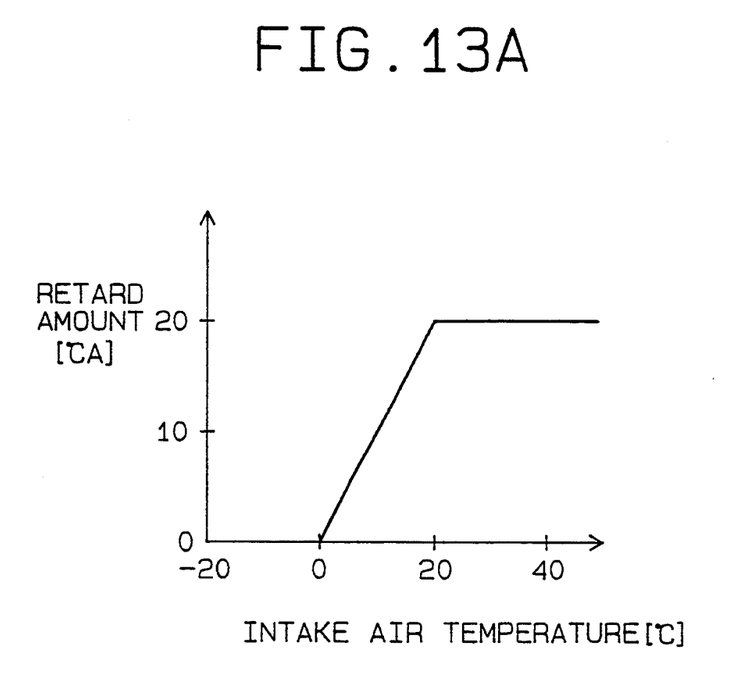
FIGS. 13A and 13B are graphs showing a target retard amount map and an ignition retard gradual change time map, respectively.
Figure 13B:
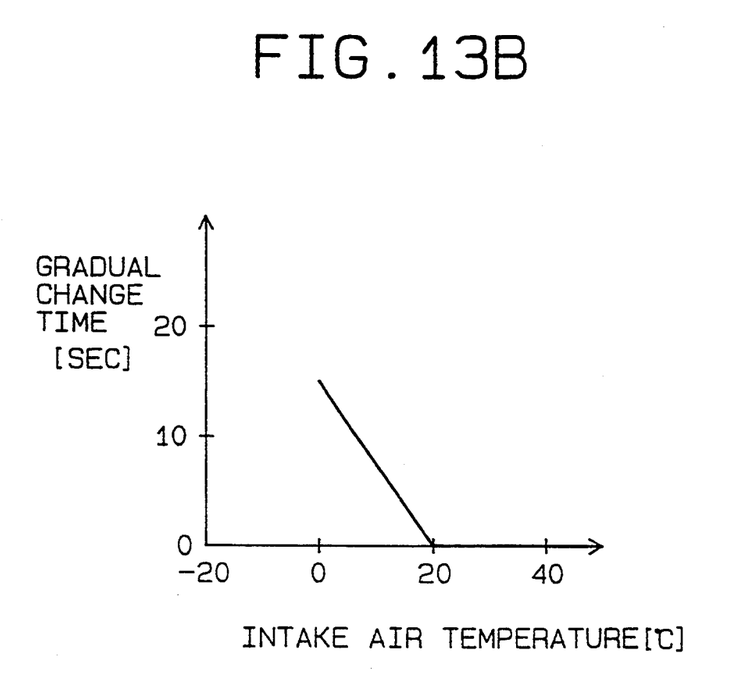

In Step 776, the target ignition retard amount and the gradual retard change time are set with reference to maps shown in FIGS. 13A and 13B which are set in correspondence with the deterioration state C representing that the catalyst is deteriorated very much. That is, as illustrated in FIG. 13A, the target retard amount is set in accordance with the intake air temperature, referring to the target retard amount map. This target retard amount is so set as to increase, at a rate twice as large as that in the deterioration state B, as the intake air temperature increases in the intake air temperature range from 0° C. through 20° C. and be constant (20° CA) in the temperature range above 20° C. As illustrated in FIG. 13B, further, the gradual retard change time map is referred and the gradual retard change time is set in accordance with the intake air temperature. This gradual retard change time is so set, in the same way as in the deterioration state C, as to decrease as the intake air temperature rises in the temperature range below 20° C. and be zero in the temperature range above 20° C. to immediately retard without gradual change.

In Step 780, ignition retard control is effected based on the target retard amount and gradual retard change time determined by the above Steps 774 and 776, respectively. This retard control is the same as that described in FIG. 4 of the first embodiment. Therefore, no explanation will be made. In the subsequent Step 790, the retard control flag CF is set to proceed to Step 800, since the ignition retard control has been performed.

In Step 800, a judgement is made as to whether or not the time lapse from the engine starting is within the limit time in which the ignition retard control according to this embodiment is performed. When the judgement indicates that the time lapse is within the limit time, the process returns to Step 750. When the judgement indicates that the time lapse has reached the limit time or the end time, the process proceeds to Step 810. In Step 810, the ignition retard control is terminated and the normal ignition advance control is performed.

As described above, the target ignition retard amount and the gradual retard change time are determined in accordance with the catalyst deterioration state and the intake air temperature under the conditions that the engine is cold and idling, the intake air temperature is above a predetermined value and the catalyst is deteriorated to the deterioration state B or C. Therefore, fast engine warm-up control can be attained without causing engine stall.

According to the third embodiment, in particular, no ignition retard control is performed during the engine warm-up period as far as the catalyst is not deteriorated. As a result, new catalysts will never be heated too much and the life of such catalyst will be extended. Further, though the temperature rise of the catalyst varies from the catalyst to catalyst depending on the state of deterioration even if the ignition retard is the same, the ignition retard control such as the ignition retard amount is changed in dependence on the deterioration state of the catalyst. Therefore, fast warm-up of the catalyst will be performed most effectively.

It is to be understood that the present invention described above should not be limited to the above-described embodiments but may be modified in many ways without departing from the spirit of the invention.

What is claimed is:

1. An ignition timing control system for an internal combustion engine for performing a fast warm-up control for a catalyst included in an exhaust system of the internal combustion engine by retarding an ignition timing when the catalyst is in the cold state, the ignition timing control system comprising:

means for detecting a start time of said internal combustion engine;

means for detecting an intake air temperature of said internal combustion engine;

means for judging whether the intake air temperature detected by said intake air temperature detecting means is higher than the specified temperature set to a temperature lower than the normal temperature or not; and means for adjusting the ignition timing retard state according to the intake air temperature detected by said intake air temperature detecting means when the start time of the internal combustion engine is detected by said start time detecting means and the intake air temperature is judged to be higher than said specified temperature by said intake air temperature judging means.

2. An ignition timing control system according to claim 1, wherein said ignition timing retard state adjusting means includes means for setting a target ignition timing retard amount according to said intake air temperature.

3. An ignition timing control system according to claim 2, wherein said ignition timing state adjusting means includes a means for adjusting the ignition timing retard gradual change time required to fulfill said target ignition timing retard amount according to said detected intake air temperature.

4. An ignition timing control system according to claim 2, wherein said target ignition timing retard amount is so set as to increase as said intake air temperature rises.

5. An ignition timing control system according to claim 3, wherein said ignition timing retard time is so set as to become larger as said intake air temperature decrease.

6. An ignition timing control system according to claim 4, wherein the specified temperature of the intake air temperature judged by said intake air temperature judging means is set to a temperature value at which said internal combustion engine tends to stall when said ignition timing is retarded.

7. An ignition timing control system according to claim 4, wherein said target ignition timing retard amount is set to a fixed amount value when said intake air temperature is higher than a first predetermined temperature.

8. An ignition timing control system according to claim 5, wherein said ignition timing gradual change time is set to zero when said intake air temperature is higher than a second predetermined temperature.

9. An ignition timing control system according to claim 1, further comprising:

means for prohibiting adjustment of the ignition timing retard state by said ignition timing retard state adjusting means when said internal combustion engine temperature is higher than the specified temperature.

10. An ignition timing control system according to claim 1, further comprising:
means for prohibiting, the adjustment of the ignition timing retard state by said ignition timing retard state adjusting means for a period from detection of the start time of the internal combustion engine by said start time detecting means to a specified control start time.

11. An ignition timing control system according to claim 1, further comprising:
means for ending adjustment of the ignition timing retard state by said ignition timing retard state adjusting means when a specified period from the detection of the start time of the internal combustion engine by said start-time detecting means to the end of the ignition timing control is passed.

12. An ignition timing control system according to claim 1, further comprising:
means for detecting whether said internal combustion engine is in an idle operation state or not; and
means for prohibiting adjustment of the ignition timing retard state by said ignition timing retard state adjusting means when said internal combustion engine is detected not to be in the idle operation state by said idle operation state detecting means.

13. An ignition timing control system according to claim 3, further comprising:
means for detecting whether said internal combustion engine is in the idle operation state or not; and
means for gradually reducing the ignition timing retard amount to zero according to the intake air temperature detected by said intake air temperature detecting means when said internal combustion engine is detected not to be in the idle operation state by said idle operation state detecting means.

14. An ignition timing control system according to claim 13, wherein the time required to gradually reduce said ignition timing retard amount is so set as to become larger as the said intake air temperature becomes low.

15. An ignition timing control system for an internal combustion engine having a catalyst for purification of exhaust gases therefrom, said system comprising:
means for detecting starting of said engine;
means for detecting a temperature of intake air supplied to said engine;
means for detecting deterioration state of said catalyst; and
means for adjusting an ignition timing of said engine in accordance with the detected intake air temperature and the detected catalyst deterioration state when the starting of said engine is detected, so that the ignition timing is variably retarded for fast warm-up of said catalyst.

16. A control system according to claim 15, further comprising:
means for prohibiting ignition timing adjustment by said adjusting means when no deterioration state of said catalyst is detected by said deterioration state detecting means.

17. A control system according to claim 15, wherein said deterioration state detecting means includes:
delay time detecting means for detecting response time delay of said catalyst; and
judging means for judging whether the detected response time delay is longer or shorter than a reference value.

18. A control system according to claim 17, further comprising:
first means for setting a first ignition retard amount when said judging means judges that the detected response time delay is longer than said reference value; and
second means for setting a second ignition retard amount larger than said first ignition retard amount when said judging means judges that the detected response time delay is shorter than said reference value.

19. A control system according to claim 15, further comprising:
retard amount setting means for setting an ignition retard amount such that the retard amount is increased as said detected intake air temperature increases and as said catalyst becomes deteriorated.

20. A control system according to claim 19, further comprising:
time setting means for setting a time period such that the time period becomes longer as the intake air temperature decreases; and
gradual change means for gradually reducing the retard amount set by said retard amount setting means during the time period set by said time setting means.

* * * * *